(12) United States Patent
Scheek et al.

(10) Patent No.: US 10,893,367 B2
(45) Date of Patent: Jan. 12, 2021

(54) LOUDSPEAKER UNIT WITH MULTIPLE DRIVE UNITS

(71) Applicant: Mayht Holding B.V., Nieuw-Vennep (NL)

(72) Inventors: Mattias Jeffrey Scheek, Delft (NL); Timothy Ruben Scheek, Delft (NL)

(73) Assignee: Mayht Holding B.V., Nieuw-Vennep (NL)

( * ) Notice: Subject to any disclaimer, the term of this patent is extended or adjusted under 35 U.S.C. 154(b) by 0 days.

(21) Appl. No.: 16/335,690

(22) PCT Filed: Sep. 21, 2017

(86) PCT No.: PCT/NL2017/050627
§ 371 (c)(1),
(2) Date: Mar. 22, 2019

(87) PCT Pub. No.: WO2018/056814
PCT Pub. Date: Mar. 29, 2018

(65) Prior Publication Data
US 2020/0037078 A1    Jan. 30, 2020

(30) Foreign Application Priority Data

Sep. 22, 2016    (NL) ..................................... 2017514

(51) Int. Cl.
*H04R 9/06*    (2006.01)
*H04R 9/02*    (2006.01)
(Continued)

(52) U.S. Cl.
CPC ............. *H04R 9/063* (2013.01); *H04R 9/025* (2013.01); *H04R 9/046* (2013.01); *H01F 7/0205* (2013.01);
(Continued)

(58) Field of Classification Search
CPC .......... H04R 9/046; H04R 9/05; H04R 9/063; H04R 1/06; H04R 2209/041; H04R 9/06;
(Continued)

(56) References Cited

U.S. PATENT DOCUMENTS 4,544,805 A * 10/1985 Sawafuji ................ H04R 9/063
181/173
4,792,978 A * 12/1988 Marquiss ............. H04R 1/2857
181/144

(Continued)

FOREIGN PATENT DOCUMENTS

DE    19523682 A1    1/1997
JP    H09322294 A * 12/1997
(Continued)

*Primary Examiner* — Davetta W Goins
*Assistant Examiner* — Kuassi A Ganmavo
(74) *Attorney, Agent, or Firm* — N.V. Nederlands Octrooibureau; Catherine A. Shultz; Tamara C. Stegmann

(57) ABSTRACT

Loudspeaker unit with a membrane (2) and a plurality of drive units (5) driving the membrane (2). Each of the plurality of drive units (5) has n voice coils (3) and at least n+1 magnets (4), n being an integer larger than or equal to 1. The magnets (4) have an axial magnetization and are stacked in axial direction with similar pole parts of adjacent ones of the at least n+1 magnets facing each other. The at least n+1 magnets (4) are separated in the stack over a magnet separation distance ($d_m$), the magnet separation distance ($d_m$) being substantially equal to a width ($w_s$) in the stack direction of the at least n voice coils (3).

14 Claims, 3 Drawing Sheets

(51) Int. Cl.
*H04R 9/04* (2006.01)
*H01F 7/02* (2006.01)
*H04R 13/00* (2006.01)
*H02K 1/17* (2006.01)
*H04R 7/04* (2006.01)

(52) U.S. Cl.
CPC .............. *H01F 7/0289* (2013.01); *H02K 1/17* (2013.01); *H04R 7/04* (2013.01); *H04R 9/06* (2013.01); *H04R 13/00* (2013.01); *H04R 2209/024* (2013.01); *H04R 2209/041* (2013.01)

(58) Field of Classification Search
CPC .. H04R 2209/024; H04R 9/047; H04R 9/025; H04R 13/00; H04R 7/18; H04R 25/00; H01F 7/0205; H01F 7/0289; H02K 1/17; H02K 41/02
See application file for complete search history.

(56) References Cited

U.S. PATENT DOCUMENTS

| | | | | |
|---|---|---|---|---|
| 7,480,392 B2* | 1/2009 | Shin | ............. | H04R 9/025 |
| | | | | 381/398 |
| 8,139,814 B2* | 3/2012 | Rottenberg | ............. | H04R 23/00 |
| | | | | 381/412 |
| 8,542,862 B2* | 9/2013 | Meguro | ............. | H04R 7/045 |
| | | | | 381/400 |
| 9,838,795 B2* | 12/2017 | Wang | ............. | H04R 9/06 |
| 2004/0008101 A1* | 1/2004 | Trandafir | ............. | H01F 7/066 |
| | | | | 335/229 |
| 2005/0031153 A1* | 2/2005 | Nguyen | ............. | H04R 9/025 |
| | | | | 381/414 |
| 2005/0163338 A1* | 7/2005 | Ohashi | ............. | H04R 9/025 |
| | | | | 381/421 |
| 2005/0207601 A1* | 9/2005 | Sagren | ............. | H04R 1/24 |
| | | | | 381/170 |
| 2006/0188120 A1* | 8/2006 | Fisher | ............. | H04R 9/025 |
| | | | | 381/338 |
| 2006/0222200 A1* | 10/2006 | Nagaoka | ............. | H04R 9/025 |
| | | | | 381/412 |
| 2006/0256997 A1* | 11/2006 | Sagren | ............. | H04R 1/24 |
| | | | | 381/412 |
| 2007/0076915 A1* | 4/2007 | Shin | ............. | H04R 9/025 |
| | | | | 381/400 |
| 2009/0141926 A1* | 6/2009 | Clair | ............. | H04R 1/403 |
| | | | | 381/404 |
| 2013/0051604 A1* | 2/2013 | Sakai | ............. | H04R 9/063 |
| | | | | 381/401 |
| 2015/0110305 A1* | 4/2015 | Noro | ............. | H04R 9/06 |
| | | | | 381/162 |
| 2015/0271605 A1* | 9/2015 | Zhang | ............. | H04R 9/043 |
| | | | | 381/401 |
| 2016/0073201 A1* | 3/2016 | Jiang | ............. | H04R 7/127 |
| | | | | 381/394 |
| 2016/0127835 A1* | 5/2016 | Jiang | ............. | H04R 9/063 |
| | | | | 381/398 |
| 2016/0212545 A1* | 7/2016 | Morgan | ............. | H02K 1/17 |

FOREIGN PATENT DOCUMENTS

JP          2010246087 A  * 10/2010
WO             00/67523 A2    11/2000

* cited by examiner

LOUDSPEAKER UNIT WITH MULTIPLE DRIVE UNITS

FIELD OF THE INVENTION

The present invention relates to a loudspeaker unit having a membrane and a plurality of drive units driving the membrane.

BACKGROUND ART

International patent publication WO2013/047792 discloses a speaker with a light and thin design, wherein multiple drive units are connected in parallel to a diaphragm. The drive units are each provided with multiple coil members positioned in parallel close to each other and connected to a frame of the speaker, and with multiple magnetic members with magnets attached to the diaphragm. In this disclosure, a coil member may comprise multiple series connected windings.

US patent publication US2006/222200 discloses an electrodynamic loudspeaker having a magnetic circuit and a vibrator. The vibrator comprises a single coil bobbin with two voice coils wound around and fixed to a portion of the coil bobbin. The two voice coils face opposite poles of a magnet. A magnetic member is furthermore fixed to the coil bobbin at a position spaced apart from the voice coils.

SUMMARY OF THE INVENTION

The present invention seeks to provide an improved loudspeaker unit having an improved performance in efficiency and power.

According to the present invention, a loudspeaker unit as defined above is provided, wherein each of the plurality of drive units comprises n voice coils and at least n+1 magnets, n being an integer larger than or equal to 1, wherein the at least n+1 magnets are magnets with an axial magnetization which are stacked in axial direction with similar pole parts of adjacent ones of the at least n+1 magnets facing each other, and the at least n+1 magnets are separated in the stack over a magnet separation distance, the magnet separation distance being substantially equal to a width in the stack direction of the n voice coils.

The present invention structure and mutual element orientation allow to provide a more efficient and cost effective loudspeaker unit.

SHORT DESCRIPTION OF DRAWINGS

The present invention will be discussed in more detail below, with reference to the attached drawings, in which FIG. 1A shows a perspective view of an exemplary embodiment of the present invention loudspeaker unit;

DESCRIPTION OF EMBODIMENTS

The present invention provides for an improved loudspeaker unit having a simple structural and electronic design, and hence have advantages over prior art loudspeakers in both technical sense and in cost efficiency. Prior art electrodynamic loudspeakers use magnets and a magnetic circuit of pole pieces, a back plate and a top plate, which channel the magnetic field into a magnetic gap. In the magnetic gap a voice coil is positioned which is mechanically coupled to a conus producing the sound waves. Other principles are used in loudspeakers of the electrostatic type and planar loudspeakers. For electrodynamic type of loudspeakers, the inductance increases when increasing the power capacity of the loudspeaker, the sensitivity is relatively limited and the structure requires a large format in view of the maximum sound level that can be produced. The electrostatic and planar type of loudspeakers have a disadvantage of a limited dynamic range and a bad low frequency response.

In accordance with the present invention embodiments, a more powerful and efficient loudspeaker unit is provided without having a too high inductance, i.e. power can be increased without a (significant) increase in inductance. Furthermore, the sensitivity is increased, and due to the absence of a closed magnetic circuit, the dimensions of the loudspeaker unit can be relatively small. As multiple drive units are employed, the support to the sound producing membrane is more evenly distributed, which will have a positive influence on the longevity and required rigidity of the membrane (membrane resonance will be less pronounced without needing to increase the moving mass of the membrane in an inefficient manner). This will result in an increased longevity and efficiency of the membrane and thus the entire loudspeaker unit.

Figure 1A:
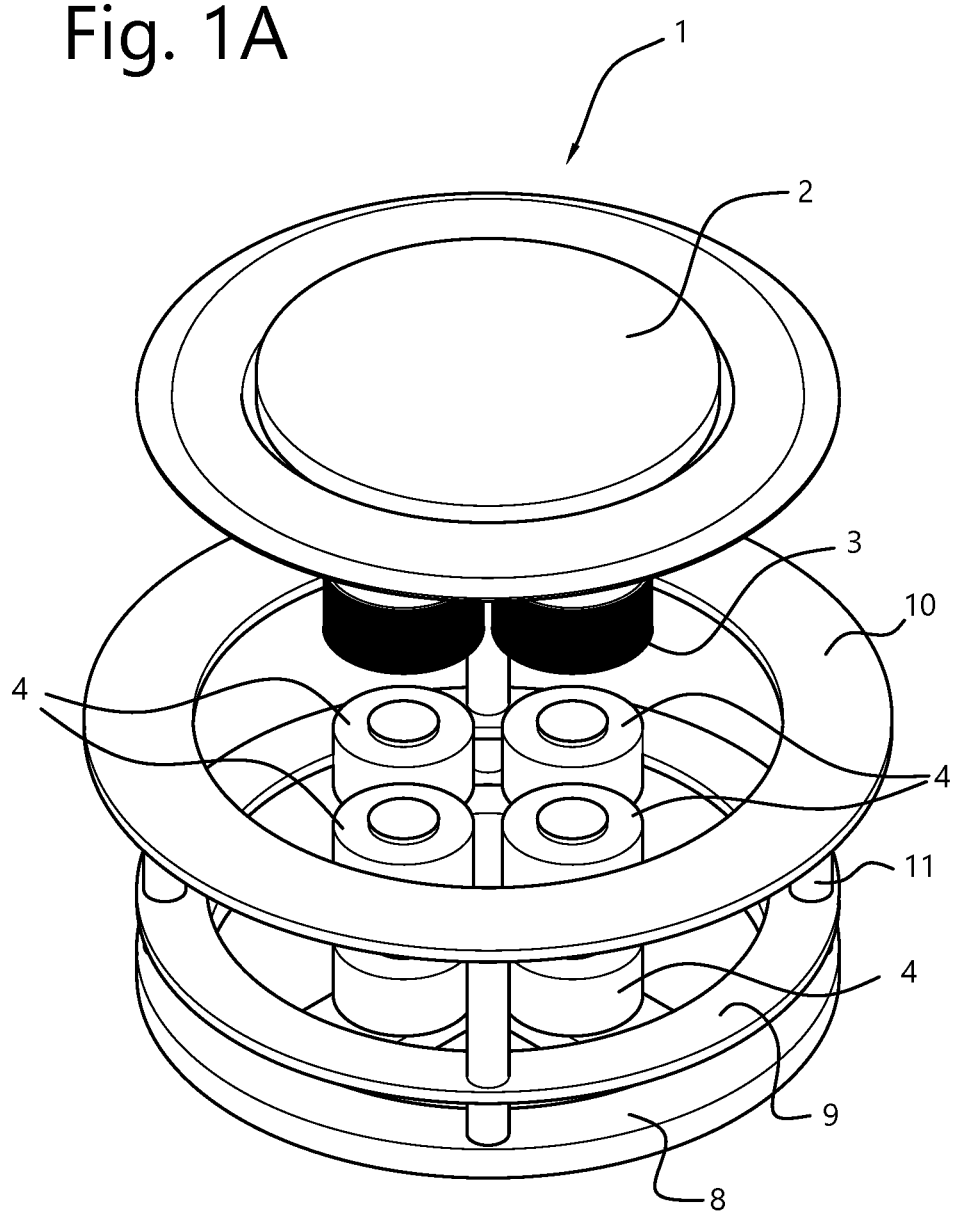
FIG. 1B shows a side view of the top part of the loudspeaker unit 1 of FIG. 1A.
FIG. 1C shows the associated side view of the bottom part of the loudspeaker unit 1 of FIG. 1A.
Figure 1B:
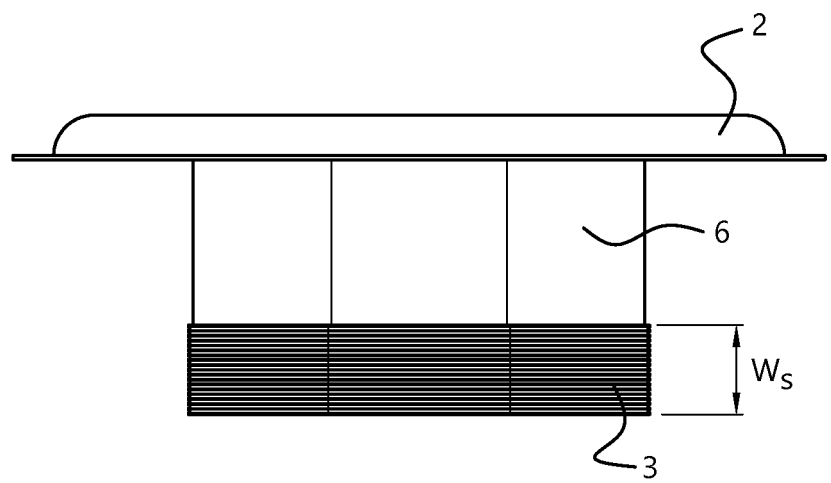
Figure 1C:
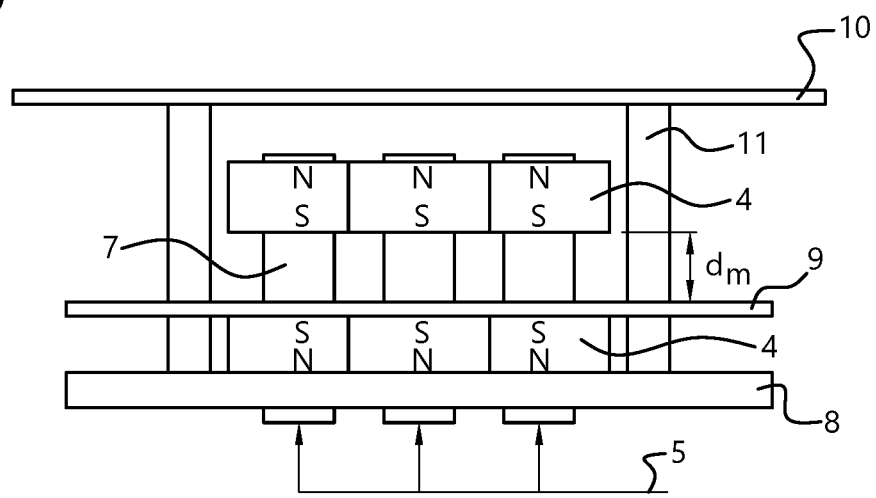

FIG. 1A shows a perspective view of an exemplary embodiment of the present invention loudspeaker unit 1, wherein a (flat) membrane 2 with associated voice coil 3 of a drive unit 5 is shown separated from the rest of the loudspeaker unit 1 for clarity. FIG. 1B shows a side view of the top part of the loudspeaker unit 1 of FIG. 1A, and FIG. 1C shows the associated side view of the bottom part of the loudspeaker unit 1 of FIG. 1A. It is noted that the membrane 2 may have a different shape than the flat membrane 2 embodiment shown in FIG. 1A-1C.

The present invention embodiments of the loudspeaker unit 1 have a membrane 2 and a plurality of drive units (indicated by arrows 5 in FIG. 1C) driving the membrane 2. Each of the plurality of drive units 5 comprises at least one voice coil 3 and at least two magnets 4 in an embodiment, or in a more generic sense, n voice coils (3) and at least n+1 magnets (4), n being an integer larger than or equal to 1. The at least two (n+1, n≥1) magnets 4 are magnets 4 with an axial magnetization which are stacked in axial direction with similar pole parts (N/S) of adjacent ones of the at least two magnets 4 facing each other (i.e. with oriented with opposite polarity). The at least two magnets 4 are separated in the stack over a magnet separation distance $d_m$, the magnet separation distance $d_m$ being substantially equal to a width $w_s$ in the stack direction of the at least one (n, n≥1) voice coil 3. As this configuration does not require any top plate, bottom plate, pole piece, or other magnetic field guidance elements, the construction can be straightforward, simple and economical. Furthermore, the structural positioning of the voice coil 3 in between the two magnets 4 allows for a double excursion possibility, greatly increasing performance of the loudspeaker unit 1.

As shown in the side view of FIG. 1B, the at least one voice coil 3 is mechanically fixed to the membrane 2, i.e. the membrane 2 will have the same movement as the at least one voice coil 3. As the voice coil 3 can be designed to be lighter than magnet 4, as a result of which the dynamic response of the loudspeaker unit 1 can be better.

In an exemplary embodiment, the at least one voice coil 3 is attached to a cylinder shaped support element 6, e.g. provided as a coil wound on an outside surface of the cylinder shaped support element 6. The cylinder shaped support element 6 is moveable with respect to the at least two magnets 4, e.g. by selecting a proper inner diameter thereof.

As shown most clearly in the perspective view of FIG. 1A, the plurality of drive units 5 (of which the magnets 4 are clearly visible) are positioned in a parallel configuration. The drive units 5 may be uniformly distributed (over the surface area of the membrane 2), e.g. in a grid or circular pattern. In further alternative embodiments, the drive units 5 may be grouped, or provided in a non-uniform distribution. This may allow specific acoustic characteristics to be provided by the present loudspeaker unit 1.

The magnets 4 of the drive units 5 are e.g. implemented as neodymium magnets which provide a high magnetic field in view of the volume of the magnet 4. In further embodiments, the at least two magnets 4 are cylinder shaped magnets], which provides a good interaction with the associated voice coil 3. In more general terms, the at least two magnets 4 are axial magnets, with a cylindrical, elliptical, square, rectangular, or polygonal cross section (wherein the shape of the at least one voice coil 3 is then selected congruent with the shape of the at least two magnets 4).

As best seen in the side view of FIG. 1C, the at least two magnets 4 are fixed at the magnet separation distance $d_m$ by a spacer 7. As the present invention embodiments do not need a specifically magnetic circuit, the spacer 7 may be of a non-magnetic material, e.g. a plastic material, which will allow a cost effective assembly and manufacturing of the loudspeaker unit 1. In an even further embodiment, the spacer 7 may be a virtual spacer, using the magnetic force of adjacent magnets 4 with the same pole (N/S) facing each other. Small structural elements may then be positioned in the loudspeaker unit to keep the at least two magnets 4 of each drive unit 5 in position.

Also shown in FIG. 1C is the embodiment implementation wherein the at least two magnets 4 are fixedly attached to a loudspeaker base frame 8. The loudspeaker base frame 8 may also be of a non-magnetic material such as plastic, but for structural reasons it could also be manufactured from a metal (even magnetic) material.

To further enhance the structural rigidity of the loudspeaker unit 1, further structural elements 9-11 can be provided, comprising a first ring element 9 and a top ring element 10. Vertical posts 11 may be provided for mechanically interconnecting the first ring element 9 and top ring element 10 to the loudspeaker base frame 8. The top ring element 10 may be provided to support a static ring part of the membrane 2.

Figure 2A:
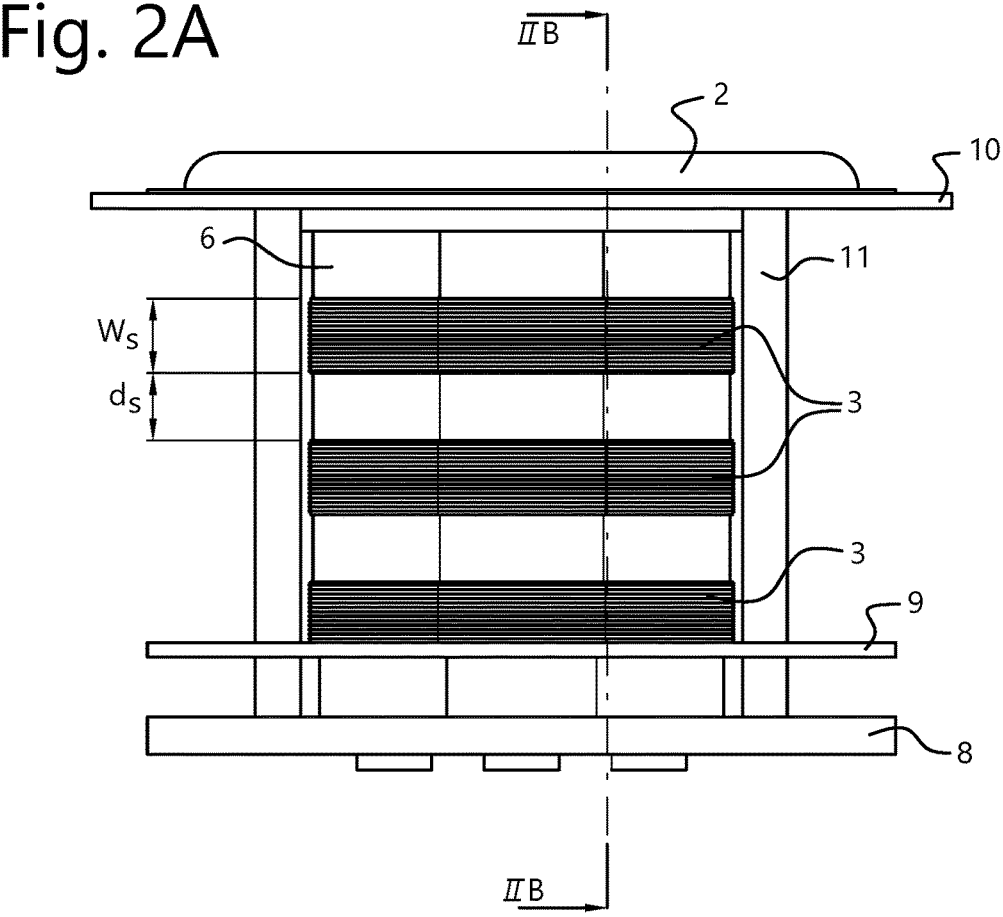
FIG. 2A shows a side view of a further embodiment of the present invention loudspeaker unit.
Figure 2B:
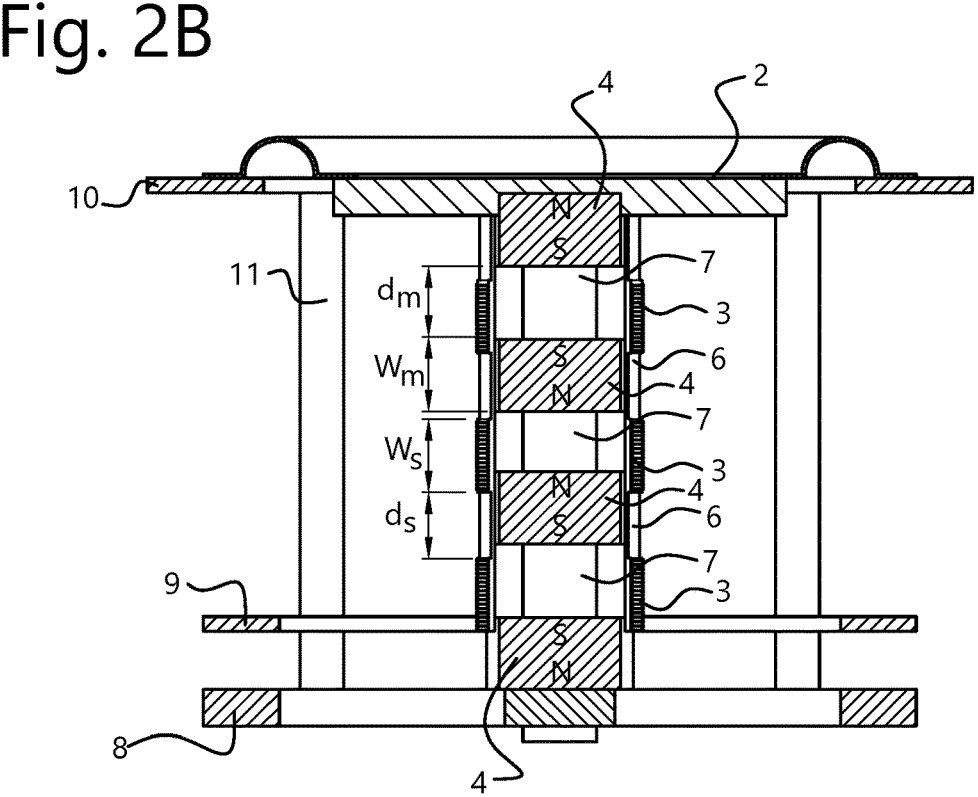
FIG. 2B shows a cross sectional view of the loudspeaker unit of FIG. 2A along the line IIB-IIB.

FIG. 2A shows a side view of a further embodiment of the present invention loudspeaker unit 1 and FIG. 2B shows a cross sectional view of the loudspeaker unit 1 along the line IIB-IIB in FIG. 2A. In this embodiment, more voice coils 3 and consequently more magnets 4 for each drive unit 5 is provided, in particular three voice coils 3 and four magnets 4 in each of the four drive units 5. The further elements constituting this embodiment are similar to the elements described with reference to the embodiment of FIG. 1A-1C, and indicated using the same reference numerals.

In generic wording, this group of embodiments can be described in that the at least one voice coil 3 comprises n voice coils 3 and n+1 magnets 4, n being an integer larger than 2. In the embodiment of FIGS. 2A and 2B, n=3. The n voice coils 3 are positioned in an axial direction over a coil separation distance $d_s$, the coil separation distance $d_s$ being substantially equal to a width $w_m$ in the stack direction of the magnet 4. The dimensions ($d_s$, $d_m$, $w_s$, $w_m$) as used in this description are clearly indicated in the side view and cross sectional view of FIGS. 2A and 2B.

In a further embodiment adjacent ones of the n voice coils 3 have an opposite winding direction. It will be clear that in cooperation with the polarity orientation of the magnets 4 in the stack of each drive unit 5 (i.e. with facing magnetic poles N/S), this will allow to amplify movement of the membrane 2, and as a result in improved performance of the loudspeaker unit 1.

For all the embodiments described with reference to the figures above, even further embodiments may be envisaged. The at least one voice coil 3 of each of the plurality of drive units 5 are electrically connected to each other in a parallel circuit connection in one further embodiment. This ensures a proper and similar operation of all parallel positioned drive units 5. As an alternative, the at least one voice coil 3 of each of the plurality of drive units 5 are electrically connected to each other in a combined parallel and series circuit connection. This embodiment would allow to modify the loudspeaker unit 1 characteristics for specific needs or specifications.

The present invention has been described above with reference to a number of exemplary embodiments as shown in the drawings. Modifications and alternative implementations of some parts or elements are possible, and are included in the scope of protection as defined in the appended claims.

The invention claimed is:

1. A loudspeaker unit having a membrane and a plurality of drive units driving the membrane,
   wherein each of the plurality of drive units comprises n voice coils and at least n+1 magnets, n being an integer larger than or equal to 1,
   wherein the at least n+1 magnets are magnets with an axial magnetization which are stacked in axial direction with similar pole parts of adjacent ones of the at least n+1 magnets facing each other, and the at least n+1 magnets are separated in the stack over a magnet separation distance (dm), the magnet separation distance (dm) being equal to a width (ws) of a voice coil of the n voice coils in the axial direction, and
   wherein the at least n+1 magnets are fixed at the magnet separation distance (dm) by a spacer, the spacer being of a non-magnetic material.

2. The loudspeaker unit according to claim 1, wherein the n voice coils are mechanically fixed to the membrane.

3. The loudspeaker unit according to claim 1, wherein the n voice coils are attached to a cylinder shaped support element (6).

4. The loudspeaker unit according to claim 1, wherein the plurality of drive units are positioned in a parallel configuration.

5. The loudspeaker unit according to claim 1, wherein the n+1 magnets are neodymium magnets.

6. The loudspeaker unit according to claim 1, wherein the n+1 magnets are cylinder shaped magnets.

7. The loudspeaker unit according to claim 1, wherein the n+1 magnets are fixed at the magnet separation distance (dm) by a spacer.

8. The loudspeaker unit according to claim 1, wherein the n+1 magnets are fixedly attached to a loudspeaker base frame.

9. The loudspeaker unit according to claim 1, wherein each of the plurality of drive units comprises n voice coils and n+1 magnets, n being an integer larger than 2, wherein the n voice coils are positioned in an axial direction over a coil separation distance (ds), the coil separation distance (ds) being equal to a width (wm) in the stack direction of the magnet.

10. The loudspeaker unit according to claim 9, wherein adjacent ones of the n voice coils have an opposite winding direction.

11. The loudspeaker unit of claim 9, wherein each of the n+1 magnets has the same width (wm).

12. The loudspeaker unit according to claim 1, wherein the n voice coils of each of the plurality of drive units are electrically connected to each other in a parallel circuit connection.

13. The loudspeaker unit according to claim 1, wherein the n coils of each of the plurality of drive units are electrically connected to each other in a combined parallel and series circuit connection.

14. The loudspeaker unit of claim 1, wherein the n+1 magnets are ring shaped magnets.

\* \* \* \* \*